June 10, 1930.  J. B. AUSTIN  1,763,032

RAIL BOND AND METHOD OF APPLYING

Filed Aug. 22, 1927

Inventor
JOHN B. AUSTIN
By
Attorney

Patented June 10, 1930

1,763,032

UNITED STATES PATENT OFFICE

JOHN B. AUSTIN, OF CLEVELAND, OHIO, ASSIGNOR TO THE OHIO BRASS COMPANY, OF MANSFIELD, OHIO, A CORPORATION OF NEW JERSEY

RAIL BOND AND METHOD OF APPLYING

Application filed August 22, 1927. Serial No. 214,578.

My invention relates to rail bonds and has particular reference to that type of rail bonds adapted for application to the rail by welding, such as by an electric arc or by the oxy-acetylene flame.

The main object of my invention is to provide a bond and a method of applying the same, in which the bond has associated with it a portion or part adapted to supply a fluxing material to re-act upon the surface of the rail and the metal applied in welding the bond to the rail so as to produce a homogeneous, solid, dense and de-gasified union between the bond and the rail.

Other objects will be disclosed hereinafter as the description of the invention progresses.

My invention resides in the new and novel construction, combination, relation of the various parts and the steps of application hereinafter disclosed in the drawing and set forth in the description.

In the application of bonds to rails in the past they have been applied by what is commonly known as soldering, in which a soft solder composed of lead and tin is employed, but this method has practically been discarded as being very inefficient, both mechanically and electrically. Bonds have also been applied in the past, and to some extent at the present day, by substituting for the soft solder a hard solder or brazing material composed of copper with a very large admixture of zinc, approximately 45%. At the present time the very great majority of bonds applied to rails are of the welded type, in which the parts composing the bond and the surface of the rail to which they are secured are brought to the point of fusion or relatively close thereto.

In the case of bonds applied by soldering or brazing, the parts are brought up to a heat sufficient to melt the solder or brazing material and the union of the bond to the rail secured under such conditions, but in the welded type of bond the flame of the electric arc or the oxy-acetylene flame are employed, whereby a very intense heat of a concentrated character can be applied to the parts and the temperature of such heating flame is around 6300 degrees F.

Under such heating conditions it is very necessary to take special precautions if it is desired to produce a connection of the bond to the rail which shall have the highest mechanical and electrical efficiency. To secure such result, the rail surface should be clean and the molten copper, which is used in attaching the bond to the rail, should have associated with it, at the time of application, a fluxing or reducing element which will result in the final weld being solid, homogeneous, of very fine grain and de-gasified.

Up to the time of my invention, the copper for attaching the bond to the rail has been supplied in the form of a copper rod having incorporated therein or having a coating on the surface thereof a fluxing material, such as silicon, manganese, phosphorus, etc. Such rod is produced at a relatively high cost compared with copper, in fact such a rod costs the operator more than twice the cost of the same amount of commercially pure copper, and the operator must carry this rod in stock continually, if he is doing bonding continually, or he must order it specially, thereby being subject to delays, etc.

If the operator could purchase bonds having associated with the terminals thereof the necessary amount of fluxing material, then it would be necessary for him to use only commercially pure copper wire in applying the bond, and such wire is comparatively cheap, as already mentioned, and at the same time he is in a position to use considerable scrap copper wire, which always accumulates in connection with an electrically operated road.

Figure 3:
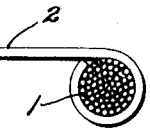
Fig. 3 is a top view of the terminal shown in Figs. 2 and 3 and shows the connecting or bonding cable composed of a plurality of round wires, forming a circular cable.
Figure 4:
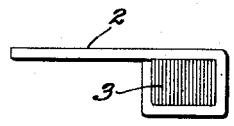
Fig. 4 shows a top view of a modified form of terminal and differing from that shown in Fig. 3, in that the bonding member is composed of a plurality of flat ribbons.

In the preferred embodiment of my invention I employ a flexible copper cable 1, of proper length and size, and which may be bent into various shapes to meet requirements, and each end of this cable is provided with a flat alloy member 2 having one end bent about and secured to the end of the cable 1, as shown in Fig. 3. If the body member 3 is composed of flat ribbons, as shown in Fig. 4, then the alloy member 2 is secured in a similar manner, as described. The alloy member 2 is composed of copper with a relatively high percentage of fluxing or reducing material, preferably silicon. The amount of fluxing material will, of course, depend upon the amount of copper necessarily added to the end of the bond in securing it to the rail, but I find, for most ordinary conditions, that an alloy member of $\frac{1}{8}''$ to $\frac{1}{16}''$ thickness and containing an amount of fluxing material up to 10% will meet ordinary requirements.

It will be appreciated that as the bond construction and conditions of application may vary considerably without departing from my invention, that it is difficult to set definite and specific conditions as to the size of the alloy member 2 and the amount of fluxing material required, and the amount of added welding metal will also materially affect the required amount of fluxing material, but my invention involves the use of an alloy member 2 of such size and having associated therewith such amount of fluxing material as required to take care of the proper fluxing and de-oxidizing action upon the rail and welding metal.

To apply the bond shown in Figs. 1 to 4 inclusive, I employ a carbon mold, as shown in Lincoln Patent 1,183,992, or as shown in my own Patent 1,511,195, and I may employ the process disclosed generally in such two patents.

Figure 5:
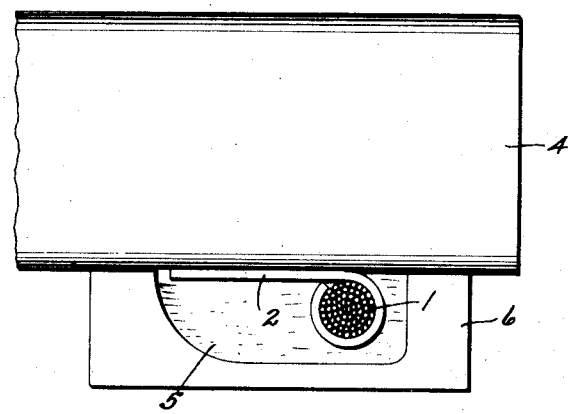
Fig. 5 shows the bond terminal disclosed in Fig 1 as positioned on the side face of the rail head and within the cavity of a mold ready for the application of the heating flame and welding metal. The form shown in Fig. 4 would be applied in the same manner as shown in Fig. 5.
Figure 7:
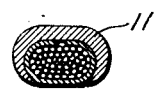
Fig. 7 is a sectional view of the bond shown in Fig. 6 on the line 7—7.
Figure 8:
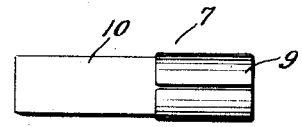
Fig. 8 shows a sleeve member composed preferably of copper with a relatively high percentage of reduced or de-oxidized material.
Figure 12:
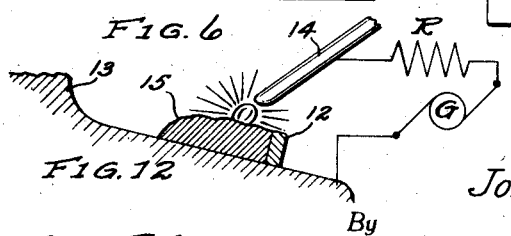
Fig. 12 is a section of the bond shown in Fig. 6 on the line 12—12 to show the relation of the parts after the welding metal has been applied, and also shows the manner in which the welding metal may be applied by means of the flame of the electric arc.

As shown in Fig. 5, there is provided the end of a rail 4. To the side face of the rail and adjacent the end thereof is positioned the bond with its end mounted within a cavity or receptacle 5 formed within a carbon mold block 6. The block 6, when applied to the rail with the bond in position forms a detachable terminal and the receptacle 5 is open at the top only, and forms a pocket to catch, support and retain the molten copper deposited therein by means of the electric arc or the oxy-acetylene flame. Both methods are well known in the art, and in the case of the electric arc the copper welding rod, which supplies metal, may act as the electrode, as shown in Fig. 12, or the electrode may be a carbon rod from the end of which is produced the arc and the welding metal applied in the form of a separate rod.

In applying the electric arc to the end of the bond shown in Fig. 5, the arc will fuse down the projecting portion of the member 2, which rests against the surface of the rail, and in fusing the high content of fluxing material therein, will re-act with the oxide on the surface of the rail and dissolve the same, and will also re-act with any oxides formed in the molten copper as deposited in the receptacle 5, and form with such oxides a distinct chemical element, which will float to the surface of the molten copper in the form of a slag, leaving the rail surface free of oxide and the mass of molten copper free of oxides and occluded gases, and permit a highly efficient alloy union between the copper and the surface of the rail.

Coincidentally with filling the receptacle 5 with the molten copper, the portion of the alloy member 2 encircling the cable 1 will be fused and likewise the end portion of the cable 1, and the molten copper will unite with the end of the cable 1, and the fluxing material contained in the member 2 will assist in forming a highly efficient union between the cable 1 and the molten copper, forming a welding head. After the receptacle has been filled with molten copper which has been deoxidized and de-gasified by means of the flux contained in the member 2, and such deposited copper has solidified, then the mold 6 may be removed. It will be understood that the mold 6 is held in position in any suitable manner, such as by an external support or by means of a spring clip extending over the head of the rail and gripping the opposite side from the mold.

It will be appreciated that the fluxing material in place of being incorporated throughout the member 2, that the member 2 may be composed of commercially pure copper and have provided on the surface thereof a coating containing the fluxing material and in a quantity sufficient to bring about the results described above. This coating material may be composed of finely prepared silicon-copper, a material which is specially prepared for the convenient application of silicon to molten copper, and which may be extremely high in silicon, and such material in powdered form may be mixed with a binder, such as varnish, and which, when applied to the copper member 2, will adhere thereto and become hard in the course of a short time. However, my preferred form is to incorporate the fluxing material with the copper, forming an alloy member. Such material when applied to the bond and the bond applied to a rail by means of a commercially pure copper rod will constitute a considerable saving to the operator, as the increased cost of the member 2 containing a high percentage of silicon, or other fluxing material, will not equal the difference in cost between commercially pure copper rod and a special copper rod containing fluxing material.

Figure 6:
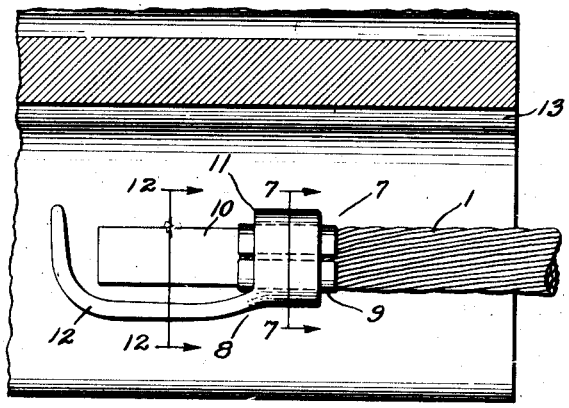
Fig. 6 is another form of bond, in which a terminal mold is provided on the bond for catching and retaining the molten welding metal, and the bond is shown as positioned upon the upper surface of a rail base.
Figure 9:
Figs. 9 and 10 are end views of Fig. 8.
Figure 10:

In Fig. 6 is shown a bond terminal in which the cable 1 has secured thereto an alloy member 7 and also a terminal member 8 composed preferably of a ferrous material. A member 7 and 8 is applied to each end of the cable 1 to produce a complete bond. The member 7 is composed of the same material as the member 2 and is formed up out of a single sheet with a tubular end 9 and a projecting tongue 10. When installed upon the end of the cable 1, with the terminal 8 in place, the engaging portion 11 of the terminal 8 will encircle partially, or it may encircle entirely the portion 9, and the tongue 10 will project out and in the direction of the upright wall 12. When applied to the rail, the end of the cable 1, the sleeve portion 11 and projecting wall 12, together with the face of the rail base will form a receptacle to catch, support and retain the molten copper used in connecting the parts together and uniting the bond to the rail.

In applying the bond to the base of the rail 13, the bond is positioned upon the rail as shown in Fig. 6. The receptacle formed by the bond in the rail is then filled with molten copper. This copper is applied by means of the oxy-acetylene flame or electric arc and preferably in the form of a rod or wire, which, in the case of the metallic arc process, forms the electrode, at the end of which the arc is formed which simultaneously fuses the electrode and the part to which the arc is applied, and the molten copper is deposited from the end of the electrode.

In Fig. 12 is shown a section of the bond and rail from Fig. 6, and also the schematic arrangement for applying the molten copper by means of a copper electrode 14. The electrode and rail are attached to a source of power G, with some form of regulator R interposed for controlling the amount of current. The electrode 14 is applied to the inner wall of the receptacle and then separated, which starts an arc, and the end of the electrode 14 fuses, and is deposited within the receptacle, and this deposition is carried on until the receptacle is filled and a deposit or head of copper 15 is formed, uniting the cable, terminal 8 and the rail each to the other.

In using the electric arc, either in the form of a carbon electrode or metallic electrode 14, I prefer to form an arc first between the electrode 14 and the tongue 10 and let the arc play along the tongue 10, simultaneously melting the end with the electrode 14 and continue until the receptacle is filled with molten copper. By this method the arc does not directly strike the rail, therefore, the rail is not pitted or injured by the arc, as is likely to be the case if the arc is applied directly to the rail. At the same time, the member 10 is fused and the fluxing material contained therein is disseminated through the mass of molten copper, and simultaneously therewith the surface of the rail is raised to a temperature at which the fused copper will unite therewith, forming an alloy union, and this is made possible for the reason that the flux contained in the portion 10 dissolves the oxide on the surface of the rail, presenting a clean surface for contact with the molten copper. The flux also acts upon the molten copper, as previously explained, and de-oxidizes and de-gasifies the molten copper. Silicon, I find, is one of the best de-oxidizers or fluxers, for the reason that it is very active and does not affect the conductivity of the copper as greatly as do other fluxes.

Figure 11:
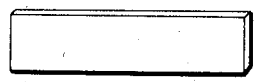
Fig. 11 is a modification of the member shown in Fig. 8.

In the case of the bond shown in Fig. 6, if desired, the sleeve portion 9 can be made separate from the tongue 10, and the sleeve 9 composed of pure copper and the tongue 10 can be a separate piece of fluxed material which is laid on the face of the rail within the receptacle, and which would be as shown in Fig. 11. The piece shown in Fig. 11 can be made of such shape as to conform to the contour of the inner surface of the wall 12 of the terminal, thereby covering the entire rail surface within the receptacle.

In the use of a flux for the members 2 and 7, I prefer a flux which has a higher melting point than that of copper, as I believe that fluxes having the higher melting point are not as readily affected by the intense heat of the arc or oxy-acetylene flame as the fluxes of lower melting point, especially zinc, magnesium, aluminum, etc. The temperature of the electric arc is about 3600 degrees C. The melting point of silicon is about 1420 degrees C., of manganese—1230 degrees C., copper—1083 degrees C., zinc—419 degrees C., aluminum—659 degrees C., and magnesium 651 degrees C.

It is believed that the advantages of having the fluxing material associated with the bond in sufficient quantity to properly re-act upon the surface of the rail and the molten copper will be readily recognized as compared with using a rod of copper, in which is contained the fluxing material, as the members 2 and 7 will not cost much, if any, more per pound than a copper rod containing a fluxing material, and there is possibly eight times as much of the rod used to fill the receptacles, as the amount of material in the members 2 and 7, and the members 2 and 7 also protect the steel rail from the direct action of the arc if it is desired that the arc shall not play upon the surface of the rail.

Figures 1, 2:
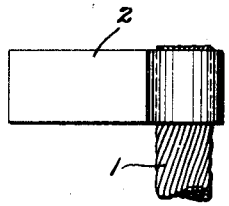
Fig. 1 shows a side view of a single terminal of one form of bond.
Fig. 2 shows an end view of the terminal shown in Fig. 1.

The member 8 may have substituted therefor a mold functioning as the mold shown in Fig. 5, and more specifically as shown in my patent 1,511,196, of October 7, 1924, and in this case only the member 7, positioned on the end of the body member, would be required, the same as in connection with the bonds shown in Figs. 1 and 4. The bonds shown in Figs. 5 and 6 are similar, in that a removable receptacle of carbon is used in one case and a metallic receptacle is used in the other case which may be removable or not before the bond is secured to the rail, but which is non-removable after the bond has been installed.

If the members 2 and 7 are used merely to protect the rail surface from the heating flame during the welding, then the metal used need not have associated therewith a fluxing agent, but may consist of commercially pure copper or other suitable material.

There are, of course, modifications to my invention herein disclosed, which will be apparent to those skilled in the art, therefore, I wish to be limited only by my claims.

I claim:—

1. A rail bond for autogenic welding to rail surfaces comprising a flexible body, a member composed of copper and a fluxing agent secured thereto having a part projecting away from the body member along the rail surface and a second member associated with the body and arranged to form a receptacle with the rail for molten welding metal and having the projecting part within the receptacle.

2. A flexible body comprising means to secure it to a rail comprising a member provided with means to engage and grip the end of the body, and having a part projecting therefrom and composed of copper associated with a fluxing agent, a second member having means to receive the end of the body and other projecting means to form with the rail surface a receptacle to catch and retain molten metal and into which receptacle projects the said projecting part to be fused and disseminated through the molten metal.

3. A rail bond to be applied to a rail by autogenic welding comprising a flexible body, a terminal member secured thereto and having a projecting portion forming with the rail surface a receptacle to catch welding metal and into which projects the end of the body and a member composed of copper and a fluxing agent positioned within the receptacle and projecting beyond the end of the body and protecting the rail surface from contact with the welding flame and to be fused and disseminated through the welding metal and act upon the rail surface.

4. The combination of a flexible body, a copper and flux alloy member secured to the end of the body and having a part projecting away from the body and means forming a receptacle with a rail surface and into which project the end of the body and the said projecting part, the various parts arranged for uniting the body end of the rail by means of molten metal deposited in the receptacle and uniting with the projecting part, the rail and the body.

5. A rail bond comprising a flexible body member having a terminal portion composed of copper containing a fluxing element secured to each end and projecting therefrom, the terminal portion comprising a part to be applied to the body member and a part projecting therefrom to be positioned along the rail face to which the bond is to be welded and to be impinged upon by the heating flame and melted down when the bond is applied to the rail and form an alloy with the copper attaching metal.

6. A rail bond comprising a flexible body member having a terminal portion composed of copper and having associated therewith a fluxing element secured to each end and projecting therefrom, the terminal portion comprising a part to engage and grip the body member, and a part projecting from said engaging part and adapted to be positioned along the rail surface to which the bond is welded and at the point of weld to be first impinged by the heating flame and fused to the rail to protect the rail thereunder.

7. A rail bond comprising a flexible copper body and a terminal portion containing a fluxing element secured to each end thereof, the terminal portion comprising a part secured to the body member and a part projecting from the securing part to be impinged upon by the heating flame and adapted to melt and unite with molten copper used in uniting the body to a rail surface and dissolve the oxides formed in the copper and upon the rail surface.

8. A rail bond adapted to have its ends attached to rails by autogenic welding comprising a flexible copper body, a portion associated with each end of the body adjacent said end, and having a portion projecting beyond the body end and extending along the surface of the rails and protecting the rail to which attaching metal is to be applied from the heating flame when applying, a reducing agent associated with the said portion and sufficient in amount to react with a body of fused copper to form heads to unite the bond ends to the rails and to de-oxidize the copper in the heads and the surface of the rails to secure uniform, solid and homogeneous heads and union of the heads to the rails.

9. A rail bond comprising a cable and a terminal secured together, the terminal comprising two portions, one comprising a part to secure the said portion to the cable and a projecting part to extend parallel to the rail and formed up of sheet copper containing a fluxing agent up to 10%, whereby copper rod containing substantially no fluxing agent may be melted in contact with the cable, rail surface and said terminal portion to form a head substantially free of oxides to unite the bond to the rail and the other portion secured to the cable end forming with the rail a receptacle about the projecting part and having an open top through which the copper rod is applied.

10. A rail bond comprising a cable, a member for application to each end thereof and composed of copper and having an amount of silicon incorporated therewith up to 10% to unite with commercially pure copper applied to the bond and rail in a molten condition to form a head to secure the bond to the rail, the said member having a part to be applied to the cable and a projecting part to extend along the rail away from the cable and interposed between the heating flames used to apply the bond and the rail to prevent the heating flame from inpinging upon the rail.

11. A terminal member for a bond comprising a portion formed of sheet metal composed of copper and having associated therewith a fluxing agent having a higher melting point than copper and having a part to extend along the rail surface to protect the rail from a welding heat and project beyond the end of a bond cable and a part for attachment to the bond cable and a second portion having a part secured to the first portion and forming with the surface of a rail a mold to catch and retain molten attaching metal.

12. A rail bond to be applied to a rail surface by autogenic welding comprising a flexible body and a terminal at each end, the terminal having a fusible part projecting away from the body along the rail surface to protect the rail surface from direct contact of the flame used to heat the parts and to be fused and united with the rail and with the fused attaching metal.

13. A bond to be applied to a rail surface by autogenic welding comprising a flexible body, a receptacle member associated with the end of the body and arranged to catch and retain molten copper in applying the bond and a fusible terminal member associated with the end of the body and projecting from the body into the receptacle to protect the face of the rail from direct contact with the heating flame while applying the bond.

14. A bond to be applied to a rail surface by separate welding metal comprising a flexible body, a terminal member associated with the rail and end of the body and forming a receptacle and arranged to catch and retain the molten welding metal and an auxiliary terminal member associated with the end of each bond and having a part projecting within the receptacle and beyond the body to receive the direct impact of the heating flame in applying the welding metal and protect the rail surface from such flame and to fuse and mingle with the welding metal and free the rail surface and welding metal from oxides.

15. The method of bonding rails comprising positioning the bond end on the surface of the rail and having the end projecting within a receptacle of which the rail surface forms one side and with an alloy member extending along the said rail surface within the receptacle recess to protect the said surface, then applying the electric arc to the alloy member within the recess without the arc striking the rail and fusing the said alloy member and simultaneously applying auxiliary molten metal melted by the heating flame of the arc to the metallic parts within the recess to unite the metallic parts each to the other.

16. A rail bond for welding to a rail by a heating flame comprising a flexible body, a mold member associated with the body and forming a receptacle with the rail for molten attaching metal and a member composed of copper and having associated therewith a fluxing agent arranged within the receptacle beyond the body end to protect the exposed rail surface from the heating flame and to be fused by the heating flame and unite with the attaching metal to unite the bond to the rail.

17. A rail bond to be welded to a rail by a heating flame and attaching metal comprising a metallic mold member associated with a flexible body and forming a receptacle with a surface of the rail to retain the attaching metal while fused and integrally united to the mold member, the body and the rail surface, a flexible body member with the end face projecting into and exposed within the receptacle and protecting a portion of the rail surface within the receptacle from the heating flame and means to protect the otherwise exposed portion of the rail surface within the receptacle from the heating flame impinging directly thereon and to fuse and mix with the fused attaching metal.

18. A rail bond for autogenic welding to rail surfaces comprising a flexible body, a member composed of copper secured thereto having a part projecting away from the body member along the rail surface and a second member associated with the body and arranged to form a receptacle with the rail for molten welding metal and having the projecting part within the receptacle.

19. The method of bonding rails by welding metal applied by heating flame comprising positioning upon the surface of the rail a bond provided with a terminal and forming with the rail surface a receptacle for molten metal and positioning in the receptacle along the exposed rail surface, before applying the welding metal, a fusible copper base member containing a flux to alloy with the welding metal and interposed between the heating flame and rail to protect the rail, and then applying a heating flame to the exposed surfaces within the receptacle to fuse the same and simultaneously adding fused welding metal and fusing the copper base metal, and heating the rail surface and alloying the copper base metal with the fused welding metal.

In testimony whereof I affix my signature.

JOHN B. AUSTIN.